(12) United States Patent
Van Der Schaar et al.

(10) Patent No.: US 7,463,683 B2
(45) Date of Patent: Dec. 9, 2008

(54) METHOD AND APPARATUS FOR DECODING SPATIALLY SCALED FINE GRANULAR ENCODED VIDEO SIGNALS

(75) Inventors: Mihaela Van Der Schaar, Ossining, NY (US); Mahesh Balakrishnan, Foster City, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1691 days.

(21) Appl. No.: 09/998,361

(22) Filed: Nov. 29, 2001

(65) Prior Publication Data

US 2002/0064227 A1 May 30, 2002

Related U.S. Application Data

(60) Provisional application No. 60/239,347, filed on Oct. 11, 2000.

(51) Int. Cl.
*H04N 7/18* (2006.01)
(52) U.S. Cl. .................. 375/240.1; 375/240.25
(58) Field of Classification Search .................. 375/240.01–240.29
See application file for complete search history.

(56) References Cited

U.S. PATENT DOCUMENTS

| | | | |
|---|---|---|---|
| 5,886,736 A * | 3/1999 | Chen | 348/43 |
| 6,092,107 A * | 7/2000 | Eleftheriadis et al. | 709/217 |
| 6,603,883 B1 * | 8/2003 | Hamanaka | 382/239 |
| 6,614,936 B1 * | 9/2003 | Wu et al. | 382/238 |
| 6,650,783 B2 * | 11/2003 | Hamanaka | 382/240 |
| 6,700,933 B1 * | 3/2004 | Wu et al. | 375/240.16 |
| 6,728,317 B1 * | 4/2004 | Demos | 375/240.21 |
| 2002/0064227 A1 | 5/2002 | Balakrishnan et al. | |
| 2002/0071486 A1 | 6/2002 | Balakrishnan et al. | |

FOREIGN PATENT DOCUMENTS

| | | |
|---|---|---|
| WO | 0205563 | 1/2002 |
| WO | 0233952 | 4/2002 |

\* cited by examiner

*Primary Examiner*—Andy S Rao

(57) ABSTRACT

A method and system for producing decoding the transmission of high-resolution images transmitted as a low resolution spatially scalable FGS encoded base layer and at least one enhancement layer is presented. The low resolution received base layer is representative of a downscaled image of the original image. In this manner, a minimum resolution base layer is transmitted and higher resolutions may be obtained and utilized depending on the available bandwidth and the receiving system resolution capability. In one aspect of the invention, the base layer is decoded and a quality enhancement is next applied to the base layer. The combined base layer and quality layer video frames are then upscaled and the upscaled image is combined with a decoded spatial enhancement layer information. The spatial enhancement layer information fills in resolution lacking in the upscaled base layer/quality layer image. Thus, a high resolution image is formed. In another aspect of the invention, a temporal layer, containing information regarding image motion, is further applied to the upscaled base layer image to produce a spatially enhanced/temporally enhanced high resolution image.

17 Claims, 4 Drawing Sheets

METHOD AND APPARATUS FOR DECODING SPATIALLY SCALED FINE GRANULAR ENCODED VIDEO SIGNALS

RELATED APPLICATION

This application is related to commonly assigned:

Provisional U.S. patent application Ser. No. 60/239,347 entitled "Spatial Scalability with FGS", filed on Oct. 11, 2000; and Co-pending U.S. patent application Ser. No. 09/975,626 entitled "Spatial Scalability for Fine Granular Video Encoding", filed Oct. 11, 2001.

FIELD OF THE INVENTION

This invention relates generally to video coding and more specifically to decoding spatial scaled fine granular encoded video signals.

BACKGROUND OF THE INVENTION

The flexibility of a Fine-Granular Scalability (FGS) video encoding enables it to support a wide range of transmission bandwidths as is described in commonly assigned U.S. patent application Ser. No. 09/347,881 entitled "System and Method for Improved Fine Granular Scalable Video Using Base Layer Coding Information" filed on Jul. 6, 1999. An FGS video encoding method is disclosed in commonly assigned U.S. patent application Ser. No. 09/5890,825 entitled "Hybrid Temporal-SNR Fine Granular Scalability Video Coding," filed on Jun. 9, 2000. In the hybrid temporal-SNR FGS application a video encoding method, and corresponding encoder, is disclosed that is operable to encode and transmit video images with enhanced quality (SNR) FGS encoded form, enhanced temporal (FGST) form and a combined hybrid FGST-SNR FGS form. In the commonly assigned co-pending related application, entitled "Spatial Scalability for Fine Granular Video Encoding", filed Oct. 11, 2001, which is incorporated by reference herein, methods and corresponding encoders, are disclosed that encode spatially scaled FGS video images. In this method, a video image is downscaled to produce a minimum resolution base layer image that can be subsequently enhanced with an enhancement layer that may provide an improved quality for the base layer, a first enhancement layer that may provide enhanced image resolution and a second enhancement layer that may provide enhanced temporal form for the enhanced image resolution layer.

However, to obtain the benefit of the spatial encoding techniques, proper decoding is necessary. Hence, there is a need for a decoding system that decodes images received in the disclosed FGS spatial scalability encoding format and structure.

SUMMARY OF THE INVENTION

A method and system is disclosed for decoding a transmitted spatially scalable FGS encoded video signal having a low resolution base layer and at least one enhancement layer. The received base layer signal is representative of a downscaled image of the original image and is used to provide a minimum resolution base layer image. The base layer is decoded and a quality enhancement is next applied to the base layer. The combined base layer and quality layer video frames are then upscaled to return the base layer and quality layer to the original image resolution. The upscaled image is then combined with decoded spatial enhancement layer information. The spatial enhancement layer information fills in resolution lacking in the upscaled base layer/quality layer image. Thus, a high resolution image is formed. In another aspect of the invention, a temporal layer containing information regarding image motion is applied to the upscaled base layer image to produce a spatially enhanced/temporally enhanced high resolution image.

Figure 1:
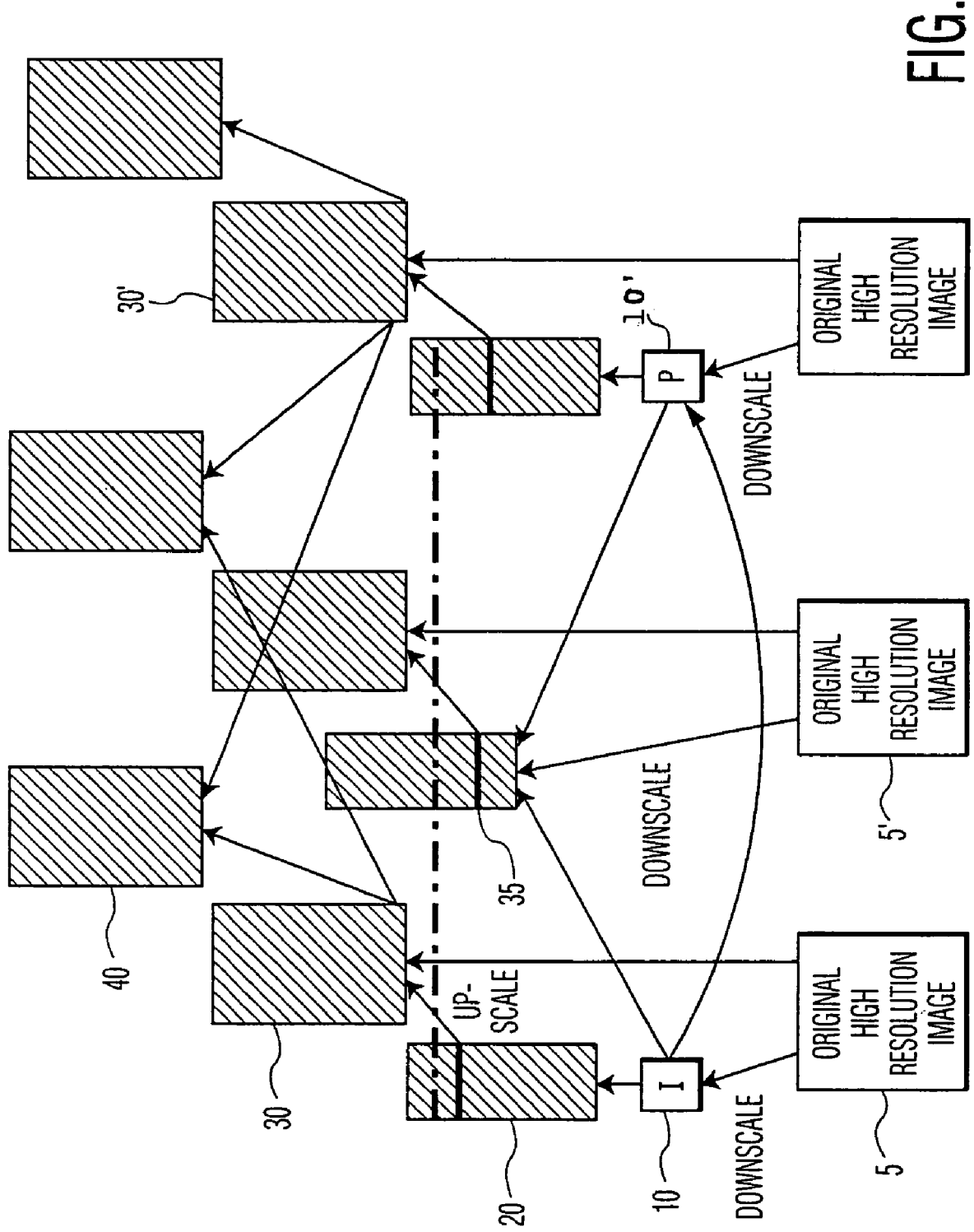
FIG. 1 illustrates a structural representation of an exemplary spatially scaled FGS encoded signal.

It is to be understood that these drawings are solely for purposes of illustrating the concepts of the invention and are not intended as a level of the limits of the invention. It will be appreciated that the same reference numerals, possibly supplemented with reference characters where appropriate, have been used throughout to identify corresponding parts.

DETAILED DESCRIPTION OF THE INVENTION

FIG. 1 depicts a structural representation of an FGS encoded signal. In this representation, an original image 5 is downscaled into a low-resolution base layer signal 10. A quality or SNR enhanced layer image 20 is formulated as a residual, or difference, of a downscaled representation (not shown) of original signal 5 and low-resolution base layer image 10. A low-resolution temporal enhanced layer 35 is formulated, in this illustrative example, as the difference between low-resolution base layer images 10, 10' and downscaled version of high-resolution image 5'. A spatial resolution enhanced layer image 30 is formulated as the residual of the original high-resolution image 5 and an upscaled version of the combined base layer image 10 and SNR enhanced layer image 20. In this case, only a portion of SNR enhanced layer image 20 is allocated for determining spatial resolution layer image 30. Optionally, a high-resolution temporal layer image 40 may be formulated, as shown in this illustrative example, as the difference between high-resolution spatial enhanced layer images 30, 30'. As would be understood the term images used herein are comparable to the terms bitplanes discussed in the aforementioned patents and patent application, which are incorporated by reference.

Figure 2:
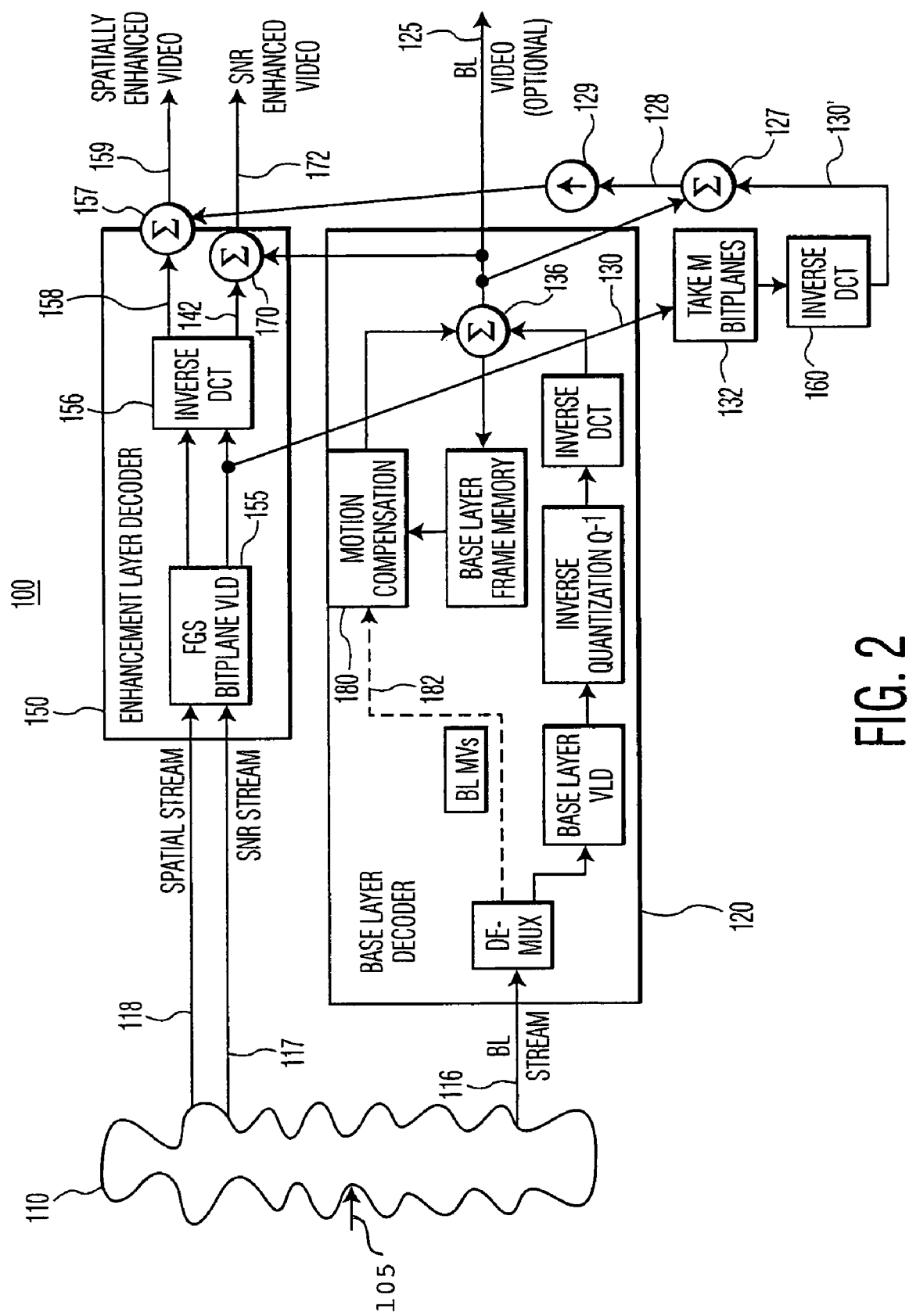
FIG. 2 illustrates an exemplary decoding system in accordance with the principles of the invention.

FIG. 2 illustrates an exemplary FGS scalable decoding system 100 in accordance with the principles of the invention wherein a received spatially encoded FGS signal is decoded. In this illustrative example, image 105 is received over a network 110, such as the Internet, telephone, etc. by decoding system 100. The received image 105 may be a single data stream consisting of packets of base layer images and at least one enhancement layer, e.g., quality/spatial/temporal enhancement layer image information, or a plurality of single data streams; one data stream for each of a transmitted base layer and/or enhancement layer images. FIG. 2 illustrates the case wherein a plurality of individual data streams are transmitted over network 110. In this case, the base layer data stream 116, and associated the enhancement layers, i.e., quality (SNR) enhancement layer 117 and spatial enhancement layer 118, data streams are applied to appropriate inputs of decoding system 100, i.e., base layer 116 is applied to a base layer decoding unit 120 and enhancement layer data streams, i.e., SNR layer 117 and spatial layer 118, are applied to enhancement layer decoding unit 150.

It would, also, be understood that the principles of the disclosed decoder would be equally applicable to the case where a single data stream composed of individual data stream layers, i.e., base layer, quality enhancement layer, spatial enhancement layer and temporal enhancement layer, multiplexed together is transmitted. In this case, the received data stream must be sorted, i.e., demultiplexed, into component layer images and applied to the appropriate elements of decoding system 100, as would be well known by those skilled in the art.

Base layer decoders 120 and methods of decoding an FGS encoded base layer are similar to those of the industry standard MPEG-2 and MPEG-4, which are well known in the art. Principles of SNR or quality enhancement layer decoding and enhancement layer decoder 150 are disclosed in commonly assigned pending patent application Ser. No. 09/590,825 entitled "Hybrid Temporal-SNR Fine Granular Scalability Video Coding," filed on Jun. 9, 2000, which is incorporated by reference herein.

Returning now to decoder 100 illustrated in FIG. 2, the output of base layer decoder 120, i.e., decoded base layer signal 125, is concurrently provided to summing unit 127 and summing unit 170. Base layer signal 125 is representative of a video signal with a minimum resolution.

Summing unit 127 combines, sums or adds the elements of signal 128 with that of decoded signal 130'. Signal 130' is representative of a known portion of signal 130, which is representative of quality enhancement layer image 117 that has been decoded by FGS decoder 155 and inverse DCT 160. The output of summing unit 127 is representative of an SNR or quality enhanced base layer signal 128. In this embodiment of decoding system 100 illustrated, a portion of SNR enhancement layer may be selected for processing by processor 132. Processor 132 is operable to allocate a select number of SNR enhancement layer bitplanes to produce signal 130'. However, it would be appreciated that signal 130 may be applied to summer 127 and hence not requiring processor 132.

Signal 128 is then applied to upscaler 129 to upscale the quality enhanced image to the original resolution. An upscaled version of signal 128 is then applied to summer 157.

Summer 157 combines upscaled version of signal 128 with spatial enhancement layer signal 158. In this case, signal 158 is a representative of spatial enhancement layer signal 118, which has been decoded by decoder 155 and inverse DCT decoder 156. The output of summer 157 is spatially enhanced video signal 159.

Summer 170 combines base layer signal 125 with decoded SNR enhancement layer video signal 142. Signal 142 is representative of quality enhancement layer image 117 decoded by FGS decode 155 and inverse DCT decoder 156. The output of summer 170 is quality enhanced base layer signal 172.

Hence, the output of decoder 100 thus is representative of a minimum resolution base layer signal 125, a quality enhanced base layer signal 172 and spatially enhanced signal 159. Although not shown or discussed, it would be understood that decoder 100 is further operable to decode and process transmitted temporal enhancement layer images though motion compensator 180, by processing transmitted base layer motion vector information.

Figure 3:
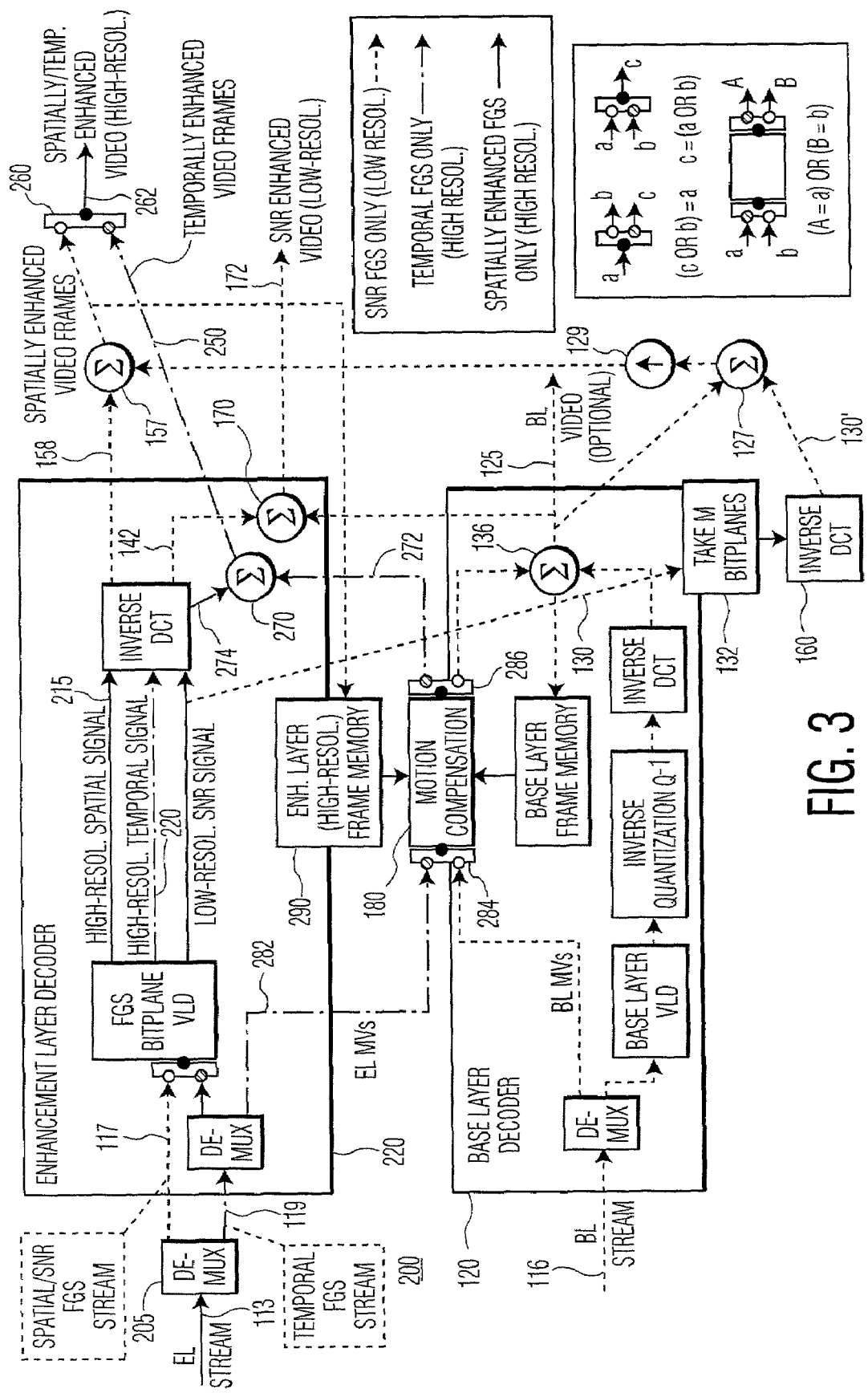
FIG. 3 illustrates a second exemplary decoding system in accordance with the principles of the invention.

FIG. 3 illustrates a second exemplary decoding system 200 in accordance with the principles of the invention. In this illustrative aspect of the invention, base layer data stream 116 is provided to base layer decoder 120, and spatial enhancement layer data stream 119 and a multiplexed SNR enhancement layer 117 and temporal enhancement layer 119 contained in data stream 113 are applied to spatial decoder 220. As illustrated, data stream 113 is decomposed, or demultiplexed, into component enhancement layers, low-resolution SNR signal 130, high-resolution spatial signal 215, and, in this case, high resolution temporal signal 220.

The operation of decoder 200 illustrated in FIG. 3 is similar to that of decoder 100 disclosed in FIG. 2, with regard to decoding and determining base layer signal 125, SNR enhancement layer signal 172 and spatial enhancement layer signal 159 and need not be discussed again.

Summer 270 formulates an enhanced temporal layer signal 250 by combining, summing or adding decoded temporal video image 274 with a motion compensated temporal signal 272. In this case, single 272 is provided by motion compensator 180, which receives spatial/temporal enhancement layer motion vector information 280. In this illustrated embodiment, compensator 180 selectively receives either temporal enhancement layer motion vector information 182 or spatial/temporal enhancement layer motion vector information 282 through selector 284. The output of selector 284 may select one input or the other input. Similarly inverse selector 286 may provide the output of motion compensator 180 to either summer 270 or summer 136. Optionally, the enhanced temporal layer 250 is applied to multiplexer 260, which timewise combines enhanced temporal layer 250 with spatially enhanced layer 159. Output 262 of multiplexer 260 is representative of a temporal/spatially enhanced layer. Further, signal 159 is applied to high-resolution frame memory 290 and also applied to motion compensator 180. Although not shown it would be appreciated that decoder unit 120 and decoder unit 220 may include separate motion compensating units, which would allow for independent operation of the decoding and determining temporal enhancement layer motion vector information and spatial/temporal enhancement layer motion vector information. In this case, selector 284 and inverse selector 286 would not be necessary.

Figure 4:
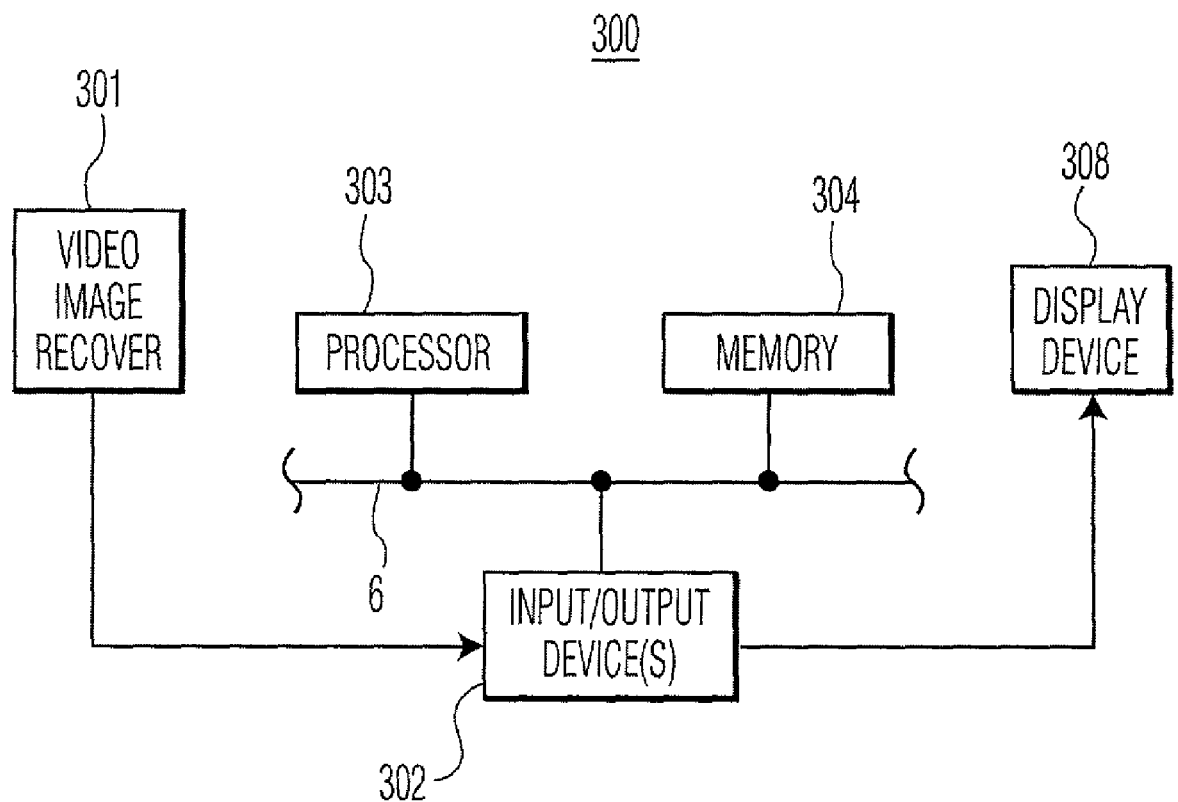
FIG. 4 illustrates an exemplary transmission/receiving system in accordance with the principles of the invention.

FIG. 4 shows an exemplary embodiment of a system 300 which may be used for implementing the principles of the present invention. System 300 may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. System 300 includes one or more video/image receiver 301, one or more input/output devices 302, a processor 303 and a memory 304. The video/image receivers(s) 301 may represent, e.g., a television receiver, a VCR or other video/image storage device. Receiver(s) 301 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 302, processor 303 and memory 304 may communicate over a communication medium 306. The communication medium 306 may represent, e.g., a bus, a communication network, one or more internal connections of a circuit, circuit card or other device, as well as portions and combinations of these and other communication media. Input video data from the receiver(s) 301 is processed in accordance with one or more software programs stored in memory 304 and executed by processor 304 in order to generate output video/images supplied to a display device 308.

In a preferred embodiment, the decoding principles of the present invention may be implemented by computer readable code executed by system 300. The code may be stored in the memory 304 or read/downloaded from a memory medium such as a CD-ROM or floppy disk. In other embodiments, hardware circuitry may be used in place of, or in combination with, software instructions to implement the invention. For example, the elements illustrated herein may also be implemented as discrete hardware elements or may be integrated into a single unit.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. A method of decoding a video signal including a base layer stream and a plurality of enhancement layer streams, said method comprising the steps of:
   decoding said base layer stream to produce base layer video frames;
   decoding first one of said enhancement layer streams to produce quality enhanced video frames;
   combining said base layer video frames and at least portions of said quality enhanced video frames to produce a first video frame output;
   upscaling said said first video frame output;
   decoding a second one of said enhancement layer streams to produce spatially enhanced video frames;
   combining said spatially enhanced video frames and said upscaled first video frame output to produce a second video frame output.

2. The method as recited in claim 1 further comprising the steps of:
   decoding a third one of said enhancement layer streams to produce temporally enhanced video frames; and
   combing said temporally enhanced video frames and said spatially enhanced video frames to produce a third video frame output.

3. The method as recited in claim 1 further comprising the steps of:
   decoding said base layer stream to produce motion compensated video frames; and
   combining said base layer video frames with said motion compensated video frames.

4. The method as recited in claim 2 further comprising the steps of:
   decoding said third one of said enhancement layer streams to produce motion compensated temporally enhanced video frames; and
   combining said temporally enhanced video frames with said motion compensated temporally enhanced video frames to produce a fourth video frame output.

5. The method as recited in claim 4 further comprising the step of multiplexing selected ones of said second, third and fourth video frame outputs to produce a combined video frame output.

6. A memory medium for decoding a video signal including a base layer stream and a plurality of enhancement layer streams, comprising:
   code to decode said base layer stream to produce a base layer video frames;
   code to decode first one of said enhancement layer streams to produce quality enhanced video frames;
   code to combine said base layer video frames and at least portions of said quality enhanced video frames to produce a first video frame output;
   code to upscale said said first video frame output;
   code to decode a second one of said enhancement layer streams to produce spatially enhanced video frames;
   code to combine said spatially enhanced video frames and said upscaled first video frame output to produce a second video frame output.

7. The memory medium as recited in claim 6 further including:
   code to decode a third one of said enhancement layer streams to produce temporally enhanced video frames;
   code to combine said temporally enhanced video frames and said spatially enhanced video frames to produce a third video frame output.

8. The memory medium as recited in claim 6 further including:
   code for decoding said base layer stream to produce motion compensated video frames; and
   code for combining said base layer video frames with said motion compensated video frames.

9. The memory medium as recited in claim 7 further including:
   code for decoding said third one of said enhancement layer streams to produce motion compensated temporally enhanced video frames; and
   code for combining said temporally enhanced video frames with said motion compensated temporally enhanced video frames to produce a fourth video frame output.

10. The memory medium as recited in claim 9 further including code for multiplexing selected ones of said second, third and fourth video frame outputs to produce a combined output.

11. A decoding apparatus for decoding a video signal including a base layer stream and a plurality of enhancement layer streams, said apparatus comprising:
    means for decoding said base layer stream to produce base layer video frames;
    means for decoding first one of said enhancement layer streams to produce quality enhanced video frames;
    means for combining said base layer video frames and at least portions of said quality enhanced video frames to produce a first video frame output;
    means for upscaling said first video frame output;
    means for decoding a second one of said enhancement layer streams to produce spatially enhanced video frames;
    means for combining said spatially enhanced video frames and said upscaled first video frame output to produce a second video frame output.

12. The apparatus as recited in claim 11 further comprising:
    means for decoding a third one of said enhancement layer streams to produce temporally enhanced video frames; and
    means for combining said temporally enhanced video frames and said spatially enhanced video frames to produce a third video frame output.

13. The apparatus as recited in claim 11 further comprising:

means for decoding said base layer stream to produce motion compensated video frames; and means for combining said base layer video frames with said motion compensated video frames.

14. The apparatus as recited in claim 12 further comprising:

means for decoding said third one of said enhancement layer streams to produce motion compensated temporally enhanced video frames; and means for combining said temporally enhanced video frames with said motion compensated temporally enhanced video frames to produce a fourth video frame output.

15. The apparatus as recited in claim 14 further comprising means for multiplexing selected ones of said second, third, and fourth video frame outputs to produce a combined video frame output.

16. The apparatus as recited in claim 11 further comprising means for demultiplexing said plurality of enhancement layer streams when said enhancement layer streams are multiplexed transmitted.

17. The apparatus as recited in claim 16 further comprising means for demultiplexing said base layer stream when said base layer steam is multiplexed transmitted.

* * * * *